UNITED STATES PATENT OFFICE.

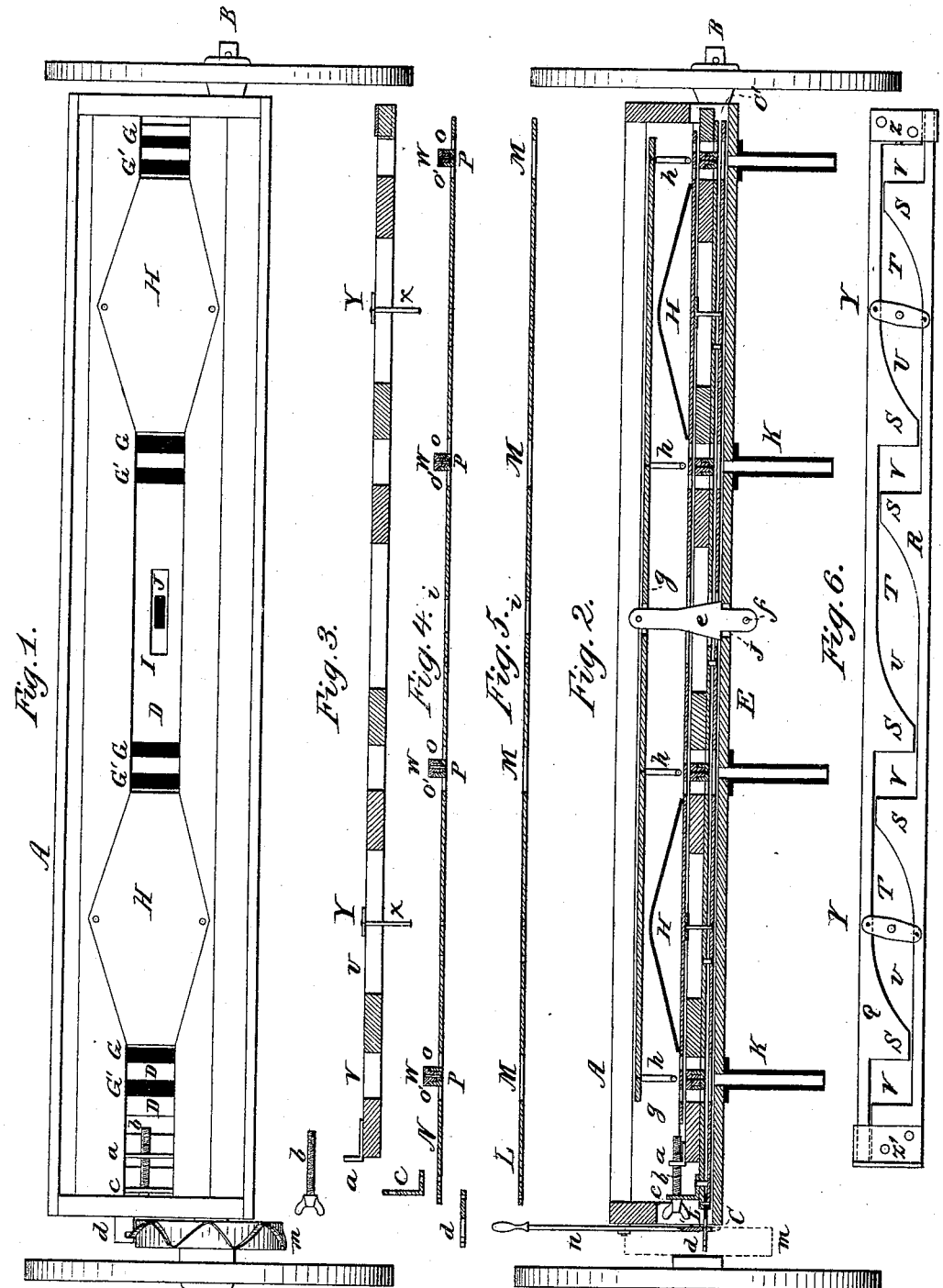

GEORGE F. STROUD, OF OSHKOSH, WISCONSIN, ASSIGNOR TO WM. D. STROUD, OF SAME PLACE.

IMPROVEMENT IN SEEDING-MACHINES.

Specification forming part of Letters Patent No. 141,143, dated July 22, 1873; application filed December 7, 1872.

*To all whom it may concern:*

Be it known that I, GEORGE F. STROUD, of Oshkosh, in the county of Winnebago and State of Wisconsin, have invented a new and useful Improvement in Seeding-Machines; and I hereby declare the following to be a full, clear, and exact description of the same, reference being had to the accompanying drawings making part of this specification, in which—

Figure 1 is a plan view of a machine embodying a part of my improvements. Fig. 2 is a longitudinal sectional view of a machine embodying my improvements. Figs. 3, 4, and 5 are detached views of the adjustable slides and metallic plates; and Fig. 6 is a plan view of the adjustable slides.

This invention relates to an improvement in that class of seeding-machines commonly termed "broadcast-seeders;" and consists, first, of two slides, made adjustable longitudinally by means of a series of pivoted arms and a set-screw, and provided with recesses and projections on one side, so shaped that when the slides are fitted together they form, alternately, a rectangular slot and an oblong slot, tapering from the center to its ends, in combination with a metallic plate provided with a series of pairs of rectangular slots, and a metallic plate provided with a series of rectangular slots, the two metallic plates being riveted together, one upon the other, and upon these are placed the adjustable slides, the whole being arranged in such a manner that the union of the several rectangular slots forms a series of bottomless double seed-cups; the object of this part of the invention being to produce a series of sliding adjustable seed-cups to convey the seed from the seed-box to the discharge-pipes in a superior manner; secondly, of an agitator, composed of a lever, the lower end of which is loosely mortised in the bottom of the seed-box, and a longitudinal sweep loosely mortised upon the upper end of the lever, and provided with a series of pendent arms, in combination with a series of sliding seed-cups made in a plate or plates extending the length of the seed-box, the whole being so arranged that when the sliding seed-cups move from side to side in the bottom of the seed-box the lever, which passes through the plates in which the seed-cups are made, will be thereby operated from side to side, and the pendent arms, which are placed directly over the seed-cups, will agitate the seed and cause it to fall into the cups, the object of this part of the invention being to insure a uniform discharge of the seed by keeping the seed-cups constantly filled when the machine is in operation.

In the accompanying drawings, the seed-box A is built around the axle B of the machine. The ends of the seed-box are provided with apertures C C', through which the series of sliding seed-cups are inserted and withdrawn. The inside of the seed-box A is beveled from the upper edges to near the bottom where it is provided with a deck or false bottom, D. A series of orifices, G G', and a slot, I, are made in the deck D. Convex blocks or plates H are placed in the seed-box A, so as to come between two orifices, G G', for the purpose of throwing the seed toward the orifices G G'. A mortise, J, is made in the bottom E of the seed-box A. Discharge-pipes K are secured to the bottom E of the seed-box. The metallic plate L is provided with a series of rectangular slots, M. The metallic plate N is provided with a series of pairs of rectangular slots, O O'. The plate N is riveted upon the plate L, and the pairs of slots O O' occupy a space equal to, and come directly over, the slots M. The slides Q R are provided with projections S and recesses T. When the slides Q R are placed together upon the plate N, they form between them the alternate slots U and V, the slots U being oblong and tapering from the center toward the ends, the slots V being rectangular. The rectangular slots V are directly over the slots M and O O'. Partitions P, between the slots O and O', come centrally over the slots M. A piece, W, of the same thickness as the slides Q R, is riveted to each partition P, thus dividing the slots V into two equal parts. The union of the rectangular slots M, O O', and V forms the bottomless double seed-cups. Pivots X, secured in the plates L and N, pass up through the oblong slots U. Arms Y, having their ends secured to the slides Q R, turn upon the tops of the pivots X. Sheaths Z Z' are secured to the ends of the slides Q R, the sheath Z to the slide Q, and the sheath Z' to the slide R. A flange, $a$, is made upon the sheath Z', and in this flange a set-screw, $b$, works, being set in a flange, $c$, secured to the plate L or N, or both. A notched connecting-bar, $d$, is hinged to the plates L and N. A lever, $e$, passes through an oblong slot, U, and a slot, $i$, in the plates L and N, and sits loosely in the mortise J in the bottom E of the seed-box A, where it is prevented from withdrawing by a pin, $f$. A longitudinal sweep, $g$, provided with a series of pendent arms, $h$, is loosely mortised upon the upper end of the lever $e$. A serpentine cam-wheel, $m$, is secured to the drive-wheel. A forked lever, $n$, clutches the connecting-bar $d$, and is used for throwing the machine in and out of gear. The series of seed-cups being formed by the union of the rectangular slots M, O O', and V, which are in the plates L and N and the slides Q R, can be withdrawn from the seed-box A through the aperture C or C' by removing the drive-wheel and the levers $e$ and $n$. The slides Q R are connected by the pivoted arms Y, so that they can be adjusted longitudinally upon the plate N, thereby increasing or decreasing the size of the slots V at pleasure. This is accomplished by turning the set-screw $b$. The seed-cups can be thereby gaged—that is to say, made smaller than the slots O O'—and by this means the flow of the seed to the discharge-pipes can be regulated. The slots M are not partitioned as the slots O O' and V are. Spaces are therefore left around the tops of the discharge-pipes K, which permit a slight flow of seed just at the time the bar containing the seed-cups is to return, having traversed the seed-box in one direction. The cam-wheel $m$ operates the plates in which the seed-cups are made, and the plates operate the lever $e$, to which the agitator is attached. As the cups $o'$ pass under the deck D, the agitator pushes the seed into them just at the moment that the contents of the cups $o$ are discharged through the pipes K. A return motion of the plates L N and slides Q R fills the cups O and empties the cups O'.

Having thus described my invention, what I claim as new and useful, and desire to secure by Letters Patent, is—

1. The slides Q R, made adjustable longitudinally by means of the arms Y pivoted on X, and set-screw $b$, and provided with projections S and recesses T, in combination with the plates L and N, provided respectively with rectangular slots M and O O', substantially as and for the purposes hereinbefore set forth.

2. An agitator, composed of the lever $e$ loosely mortised in the bottom of the seed-box A, and the longitudinal sweep $g$ provided with the pendent arms $h$ and mortised upon the upper end of the lever $e$ when operated by the plates L and N, substantially as and for the purpose hereinbefore set forth.

3. In combination, the serpentine cam-wheel $m$, plates L N, slides Q R provided with the slots M, O O', U, and V, all arranged relatively one to the other, substantially as and for the purposes hereinbefore set forth.

In testimony that I claim the foregoing improvement in seeding-machines, as above described, I have hereunto set my hand and seal.

GEORGE F. STROUD. [L. S.]

Witnesses:
J. H. MEARS,
JAS. M. STROUD.